United States Patent [19]

Galloway

[11] 4,295,491
[45] Oct. 20, 1981

[54] DOUBLE ANGLED-DISC DIVERTER VALVE OR THE LIKE

[75] Inventor: Tod R. Galloway, Menasha, Wis.

[73] Assignee: Fox Valley Process Systems & Supply, Inc., Menasha, Wis.

[21] Appl. No.: 150,085

[22] Filed: May 15, 1980

[51] Int. Cl.³ ............................................. F16K 11/02
[52] U.S. Cl. ................................ 137/625.46; 137/875; 137/876
[58] Field of Search ................... 137/875, 862, 625.44, 137/625.46, 876

[56] References Cited

U.S. PATENT DOCUMENTS

| | | |
|---|---|---|
| 7,964 | 11/1877 | Birkinbine . |
| 1,218,126 | 3/1917 | Smith . |
| 1,313,762 | 8/1919 | Thomas . |
| 1,482,413 | 2/1924 | Ryder ............................... 137/862 X |
| 1,763,802 | 6/1930 | Levy . |
| 2,188,969 | 2/1940 | Waldvogel . |
| 2,244,986 | 6/1941 | Drane . |
| 2,383,861 | 8/1945 | Hopkins . |
| 2,840,338 | 6/1958 | Shaw . |
| 2,882,010 | 4/1959 | Bryant . |
| 2,892,609 | 6/1959 | Bibbo . |
| 2,934,312 | 4/1960 | Stevens . |
| 3,080,145 | 3/1963 | Swain . |
| 3,126,193 | 3/1964 | Atherton . |
| 3,260,502 | 7/1966 | Plumer . |
| 3,282,555 | 11/1966 | Mallonee et al. . |
| 3,386,474 | 6/1968 | Kimmel . |
| 3,471,021 | 10/1969 | Priller ......................... 137/625.46 X |
| 3,508,737 | 4/1970 | Sikorcin . |
| 3,556,475 | 1/1971 | Olenik . |
| 3,727,879 | 4/1973 | Lange et al. . |
| 3,779,511 | 12/1973 | Wenglar . |
| 3,837,616 | 9/1974 | Scanderbeg . |
| 3,967,779 | 7/1976 | Logsdon . |
| 3,973,590 | 8/1976 | Logsdon . |
| 3,994,335 | 11/1976 | Perkins . |
| 4,039,005 | 8/1977 | Clifford . |

OTHER PUBLICATIONS

Lumaco, Inc. Brochure, "The Seven Star Sanitary Minidisc Valve", 1977.

Primary Examiner—Arnold Rosenthal
Attorney, Agent, or Firm—Quarles & Brady

[57] ABSTRACT

A diverter valve comprises a body defining a through passage and a perpendicular branch passage. A valve stem extends into the housing at a 45° angle to both passages and carries two spaced and parallel discs at a 45° angle to the valve stem and in respective passages. The valve stem is reciprocally rotatable about its longitudinal axis, rotation in one direction causing one disc to move to an open position while the other moves to a closed position, and vice versa. In the preferred embodiment, the valve body is made up of three disconnectable sections with annular valve seals located between facing ends of the sections.

5 Claims, 2 Drawing Figures

DOUBLE ANGLED-DISC DIVERTER VALVE OR THE LIKE

BACKGROUND OF THE INVENTION

Angled-disc valves are known in the art—see for example U.S. Pat. Nos. 3,126,193 and 3,779,511. In general, such valves comprise a rotatable valve stem disposed at a 45° angle to a straight passage and a disc disposed at a 45° angle to the valve stem, rotation of the stem about its longitudinal axis thus causing the disc to move between perpendicular closed and parallel open positions with respect to the passage. Such valves are highly desirable because they are relatively simple but quite effective, and they are particularly desirable for sanitary applications since they do not tend to trap material in a manner that precludes effective conventional cleaning. Heretofore, however, such valves have used single discs and it has not been apparent that they could be used for applications such as diverter valves.

Diverter valves having two discs on a common stem are also known—see for example U.S. Pat. Nos. 1,313,762 and 1,482,413. Prior constructions of this type are not entirely suitable, however, since they require that the main and branch passages be essentially parallel as opposed to the perpendicular orientation generally desired for ease of manufacture and use in connection with standard components, and because there are at least two shaft entry or exit openings which makes cleaning more difficult. Other diverter valves have perpendicular passages, but use complicated linkages or other arrangements that are expensive, may be difficult to maintain, and may tend to trap materials.

SUMMARY OF THE INVENTION

This invention contemplates a double angled-disc diverter valve with perpendicular passages and a single valve stem carrying two discs, one in each passage, rotation of the stem causing operation of both discs. In the preferred embodiment, the discs are parallel so that one opens when the other closes, but they could be oppositely angled to open and close at the same time. Also in the preferred embodiment, the valve body is sectioned with seal rings located by facing ends of the sections.

The construction of the invention is relatively simple and inexpensive, yet highly effective and versatile. These and other objects and advantages will appear from the description to follow.

DESCRIPTION OF THE PREFERRED EMBODIMENT

Figure 1:
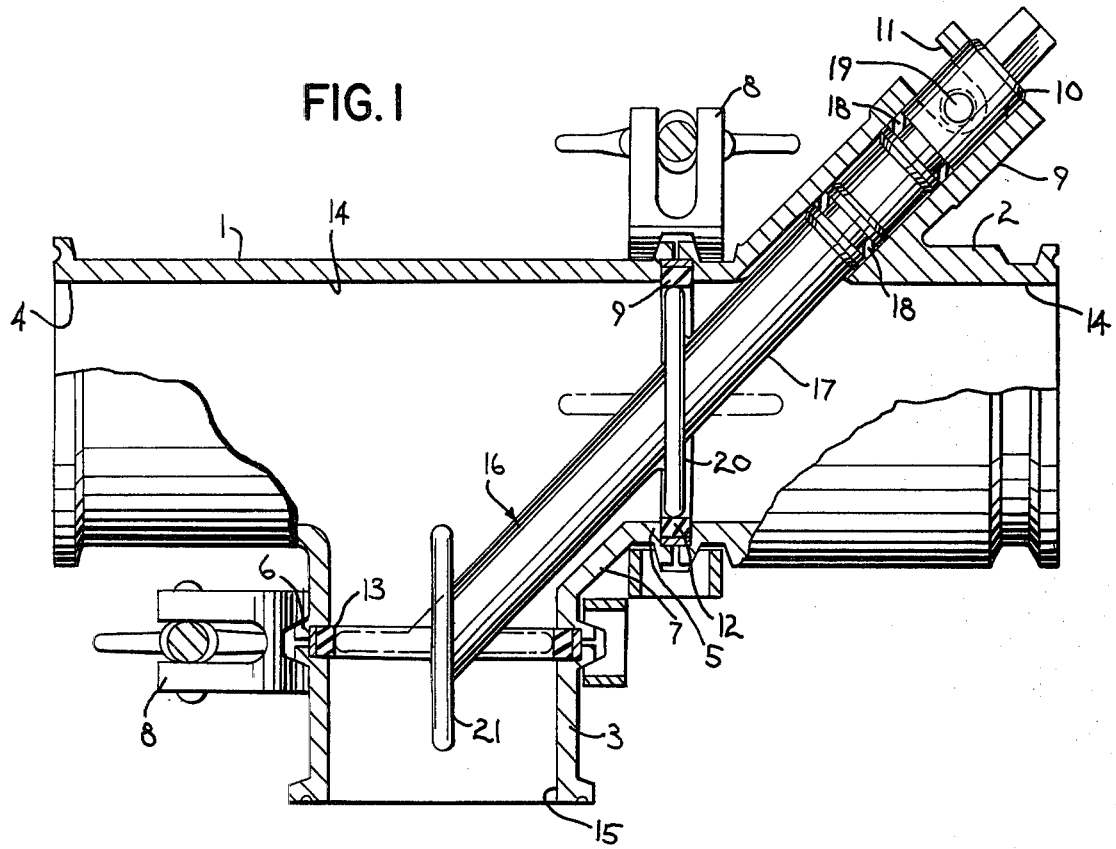
FIG. 1 is a side view, partially broken away and in cross section, of a diverter valve constituting a preferred embodiment of the invention, alternative positions of the valve discs being shown in broken lines.
Figure 2:
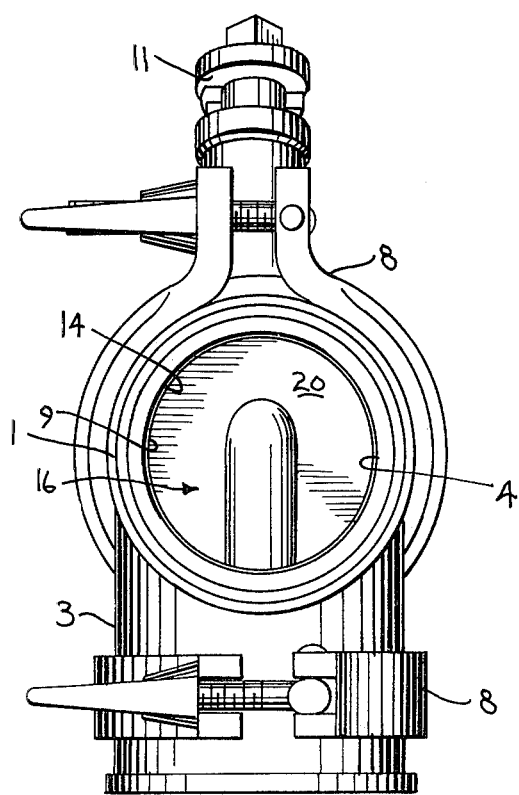
FIG. 2 is an end view of the valve of FIG. 1, from the left as the valve is shown in FIG. 1.

The preferred embodiment of the invention is a valve for sanitary clean-in-place applications, and includes a three piece valve body made up of a main section 1, a through extension section 2 and a branch extension section 3, all formed of stainless steel. The main section 1 has an inlet end 4 shaped to be connectible into a desired system, a flanged through outlet 5 and a flanged branch outlet 6. It is angled as shown at 7 to provide the depth and clearances desired in the preferred embodiment, but the angled portion may not be necessary in other configurations.

The ends of the extensions 2 and 3 that face, respectively, the outlets 5 and 6 are also flanged, and the sections are removably held together by conventional clamps 8. The outer ends of the extensions are shaped to be connected into the desired system. The through extension 2 is shaped to define a generally cylindrical valve stem housing 9 having a central bore 10 and a cutaway portion 11 near its outer end that extends radially outwardly from the bore 10 around approximately half its circumference.

A through seal ring 12 is removably disposed in suitable recesses in the facing flanged ends of the outlet 5 and extension 2 and is also effectively clamped in place by the associated clamp 8. A similar branch seal ring 13 is between the facing ends of the outlet 6 and extension 3. The rings 12 and 13 are formed of any suitable sealing material such as natural or synthetic rubbers or plastics, and both seals are preferably provided with metal backing rings as shown.

The main body section 1 and extension 2 together define a straight through passage 14 of circular cross section. The branch outlet 6 and extension 3 together define a straight branch passage 15 of circular cross section that intersects and is perpendicular to the passage 14. While the valve body shown is conventional in some respects, the three piece construction shown is a particular feature of the preferred embodiment in that it provides for simplicity in manufacture, assembly and maintenance and also locates the seals 12 and 13 for interaction with the valve element described below. Other configurations are, however, possible.

The valve element proper is designated generally by the reference numeral 16, and in the preferred embodiment it is of one piece, stainless steel construction although it could be made of other materials or assembled parts. The valve 16 includes a cylindrical stem 17, the outer or actuating end of which is rotatably disposed in and extends through the bore 10. Spaced O-rings 18 are provided to effect a fluid tight seal. A cross pin 19 is fixed near the outer end of the stem 17 and is disposed in the cutaway portion 11, this arrangement allowing the stem 17 to be reciprocally rotated about its longitudinal axis through approximately 180°. Rotation may be effected using any suitable tool or mechanism (not shown but well known to those skilled in the art) connected to the outer end of the valve stem 17, which is squared for this purpose in the embodiment shown.

The stem 17 is disposed at a 45° angle to the through passage 14 and also to the branch passage 15. It carries an integral, intermediate circular through valve disc 20 and an integral circular branch valve disc 21 at its free or inner end. The discs 20 and 21 are parallel to one another, and both are disposed at 45° angles to the longitudinal axis of the valve stem 17. The disc 20 operates with the seal 12 to control the through passage 14, and the disc 21 operates with the seal 13 to control the branch passage 15. The valve 16 is entirely in the valve body except for the actuating end, and it is not directly connected to and is clear of the interior of the body except for engagement of the discs 20, 21 with the seals 12, 13.

As shown in full lines in FIG. 1, the valve 16 is in what can be termed a divert position. In this position, the disc 20 is in a perpendicular or closed position in which it extends across and closes the through passage 14, while the disc 21 is in a parallel or open position with respect to the passage 15 so that the latter is open. If the valve stem 17 is rotated through 180°, the discs 20 and 21 will be simultaneously actuated and move to the positions shown in broken lines in FIG. 1, which can be called a through position for the valve. In through position, the disc 21 is in a perpendicular closed position across and closing the branch passage 15, while the disc 20 is in a parallel open position, thus opening the through passage 14.

The valve of the invention provides an extremely effective control for selection of through or diverted flow. It is particularly suited for sanitary applications since the stem 18 and discs 20 and 21 are essentially free in the valve body and the bore 10 is the only entry opening, as the result of which there is little or no tendency to trap material in a manner that precludes effective conventional cleaning. The through and branch passages are perpendicular to one another, so that the valve can easily be used in conventional installations. The entire valve is simple and inexpensive to manufacture and assemble, and also to maintain for example in connection with replacement of the seals.

While a preferred embodiment of the invention has been shown and described, it will be obvious that various modifications are possible without departure from the spirit of the invention. As previously indicated, other valve body configurations might be used. Also, the position of either of the discs 20 or 21 could be changed by 90° (which would still leave it at an angle of 45° to the stem 17) so that the two discs would be perpendicular to one another, in which event both passages would be closed in one position of the valve and opened in another. This configuration would, for example, be useful in a blending application where the extensions 2 and 3 would serve as inlets and the end 4 would become an outlet. While the 45° configuration is preferred, other oblique angles could be used; but only a substantially 45° configuration will provide a full 90° change of position for the discs and allow full open and full closed positions in perpendicular passages. In view of these and other possible modifications, the invention is not intended to be limited by the showing or description herein, or in any other manner except insofar as may be required.

I claim:

1. A double angled-disc valve comprising:
   a valve body defining a a substantially straight through passage and a substantially straight branch passage substantially perpendicular to the through passage:
   a single valve stem at least partially within the valve body, said valve stem having a longitudinal axis at substantially at 45° angle relative to both passages and being reciprocally rotatable about its longitudinal axis;
   and a pair of valve discs fixed to the valve stem at angles of substantially 45° relative to the longitudinal axis of the stem, each disc being disposed in a respective one of the passages and being actuable between parallel open and perpendicular closed positions with respect thereto, rotation of the valve stem about its longitudinal axis causing simultaneous actuation of the discs.

2. A valve according to claim 1, wherein:
   the valve discs are parallel so that when one is in a closed position the other is in an open position.

3. A valve according to claim 2, wherein:
   the valve stem has an actuating end extending outwardly through the valve body and is otherwise completely within the body;
   and the portion of the valve stem within the valve body is not directly connected thereto.

4. A valve according to claim 2, wherein:
   the valve body comprises a main section defining an inlet and a through outlet and a branch outlet, a through extension removably connected to the through outlet, and a branch extension removably connected to the branch outlet.

5. A valve according to claim 4, wherein:
   the valve discs cooperate with annular seal rings;
   one seal ring is removably held between the facing ends of the through outlet and through extension;
   and the other seal ring is removably held between the facing ends of the branch outlet and branch extension.

* * * * *

UNITED STATES PATENT AND TRADEMARK OFFICE
CERTIFICATE OF CORRECTION

PATENT NO. : 4,295,491

DATED : October 20, 1981

INVENTOR(S) : Tod R. Galloway

It is certified that error appears in the above—identified patent and that said Letters Patent is hereby corrected as shown below:

Col. 4, line 5, delete "a" (second occurrence)

Col. 4, line 8, ":" should be -- ; --.

Col. 4, line 11, "at" should be -- a --.

Signed and Sealed this

Ninth Day of February 1982

[SEAL]

Attest:

Attesting Officer

GERALD J. MOSSINGHOFF

Commissioner of Patents and Trademarks